(12) United States Patent
Serrano

(10) Patent No.: US 9,115,839 B1
(45) Date of Patent: Aug. 25, 2015

(54) CYLINDRICAL FOAM TUBE STRENGTHENING AND INTERCONNECTING SYSTEM

(76) Inventor: German J. Serrano, Miami, FL (US)

( * ) Notice: Subject to any disclaimer, the term of this patent is extended or adjusted under 35 U.S.C. 154(b) by 55 days.

(21) Appl. No.: 13/440,484

(22) Filed: Apr. 5, 2012

(51) Int. Cl.
*F16L 41/03* (2006.01)

(52) U.S. Cl.
CPC ...................... *F16L 41/03* (2013.01)

(58) Field of Classification Search
CPC ..................................................... F16L 41/03
USPC ........... 285/285, 240, 921, 305, 125.1, 129.1, 285/130.1; 446/124, 125, 126, 153; 403/205; 441/129
See application file for complete search history.

(56) References Cited

U.S. PATENT DOCUMENTS

| | | | |
|---|---|---|---|
| 3,004,784 A | 10/1961 | Selby | |
| 3,452,989 A | 7/1969 | Jernstrom | |
| 3,851,980 A | 12/1974 | Worth et al. | |
| 4,711,595 A * | 12/1987 | Magid et al. ................. | 403/205 |
| 4,918,877 A * | 4/1990 | Dutka ........................... | 285/239 |
| 5,097,645 A | 3/1992 | Sanderson | |
| 5,131,783 A | 7/1992 | Astl | |
| 5,238,231 A | 8/1993 | Huang | |
| 5,382,111 A * | 1/1995 | Melashenko et al. ......... | 403/329 |
| 5,385,498 A * | 1/1995 | Parvardeh ..................... | 441/129 |
| 5,390,463 A | 2/1995 | Sollner | |
| 5,454,661 A | 10/1995 | Litvin et al. | |
| 5,771,650 A | 6/1998 | Williams et al. | |
| 5,853,203 A | 12/1998 | Crandall | |
| 6,132,276 A * | 10/2000 | Leemon ........................ | 441/129 |
| 6,413,004 B1 * | 7/2002 | Lin ................ | 403/176 |
| 6,478,649 B1 * | 11/2002 | Hoback ......................... | 446/126 |
| 6,554,677 B2 * | 4/2003 | Leemon ........................ | 446/124 |
| 7,318,762 B2 * | 1/2008 | Goldmeier .................... | 441/129 |
| 7,364,487 B2 * | 4/2008 | Evans et al. .................. | 446/124 |
| 7,708,317 B2 | 5/2010 | Leblanc | |
| D618,968 S | 7/2010 | Belden | |
| 8,403,723 B1 * | 3/2013 | Haner ........................... | 446/124 |
| 2006/0270291 A1 * | 11/2006 | Goldmeier .................... | 441/88 |
| 2009/0093182 A1 | 4/2009 | Jacobs et al. | |
| 2009/0278101 A1 | 11/2009 | Connachan et al. | |
| 2012/0068028 A1 * | 3/2012 | Arnold et al. ............... | 248/205.2 |
| 2012/0184174 A1 * | 7/2012 | Kwak et al. .................. | 446/124 |
| 2012/0269570 A1 * | 10/2012 | Felber .......................... | 403/205 |
| 2012/0280490 A1 * | 11/2012 | White .......................... | 403/315 |
| 2013/0052896 A1 * | 2/2013 | Abraham ...................... | 441/129 |
| 2013/0237120 A1 * | 9/2013 | Haner .......................... | 446/153 |
| 2013/0244530 A1 * | 9/2013 | Renfro ......................... | 446/124 |
| 2013/0294823 A1 * | 11/2013 | Bartow et al. ................ | 403/343 |

* cited by examiner

Primary Examiner — David E Bochna
(74) Attorney, Agent, or Firm — Albert Bordas, P.A.

(57) ABSTRACT

A cylindrical foam tube strengthening and interconnecting system having at least one housing with an exterior wall and an interior wall and at least one edge. Extending a predetermined distance from the at least one edge, the interior wall has at least one channel that terminates at a hole. At least one connector is fixed to the at least one housing and to a noodle to build a structure. The noodle is a cylindrical hollow piece of polyethylene foam used while swimming, learning to swim, for floating, for rescue reaching, in various forms of water play, for aquatic exercise.

32 Claims, 24 Drawing Sheets

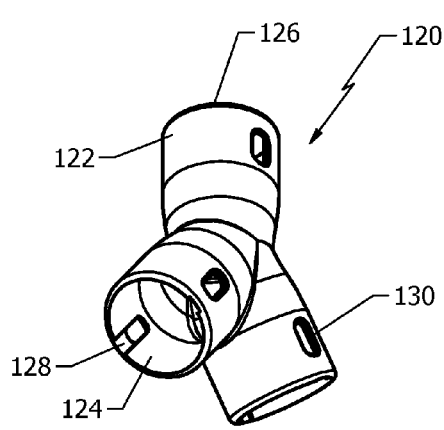 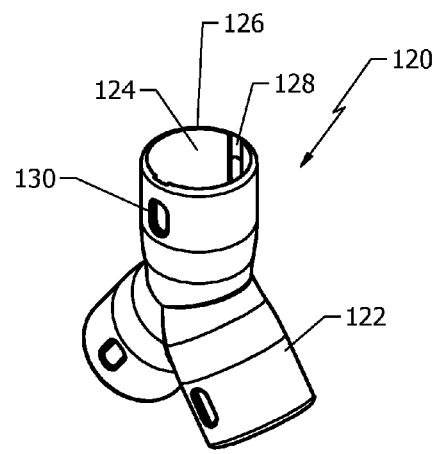
Fig. 10A　　Fig. 10B
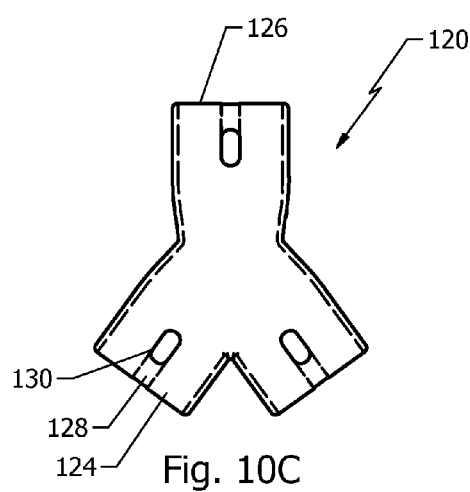
Fig. 10C

US 9,115,839 B1

CYLINDRICAL FOAM TUBE STRENGTHENING AND INTERCONNECTING SYSTEM

BACKGROUND OF THE INVENTION

1. Field of the Invention

The present invention relates to noodle accessories to build structures, and more particularly, to cylindrical foam tube strengthening and interconnecting systems.

2. Description of the Related Art

A noodle, also defined as a pool noodle, water log, or woggle is a cylindrical piece of polyethylene foam, typically hollow. Noodles are used by people of all ages while swimming. They are useful when learning to swim, for floating, for rescue reaching, in various forms of water play, and for aquatic exercise.

Applicant is aware of noodle connectors that are foam pieces, slightly larger than a noodle so that it can connect two pool noodles by encasing the end of each. There exist at least two-, four- and six-hole connectors. However, Applicant is not aware of any cylindrical foam tube strengthening and interconnecting system having the benefits of the present invention.

SUMMARY OF THE INVENTION

The instant invention is a cylindrical foam tube strengthening and interconnecting system.

It is therefore one of the main objects of the present invention to provide a cylindrical foam tube strengthening and interconnecting system that is buoyant.

It is another object of this invention to provide a cylindrical foam tube strengthening and interconnecting system that can be readily assembled and disassembled without the need of any special tools.

It is another object of this invention to provide a cylindrical foam tube strengthening and interconnecting system that is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 10A is a first isometric view of a sixth embodiment housing.

FIG. 10B is a second isometric view of the sixth embodiment housing seen in FIG. 10A.

FIG. 10C is a front view of the sixth embodiment housing seen in FIG. 10A.

DETAILED DESCRIPTION OF THE PREFERRED EMBODIMENT

Figure 1:
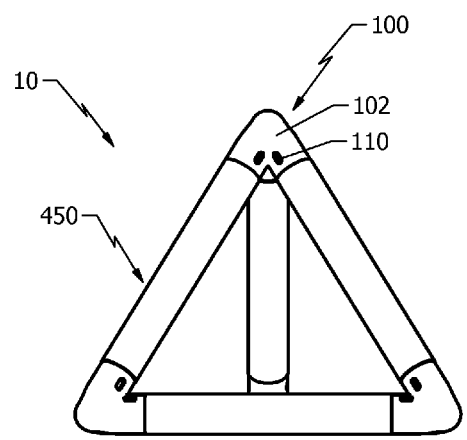
FIG. 1 is a first isometric view of the present invention.
Figure 2:
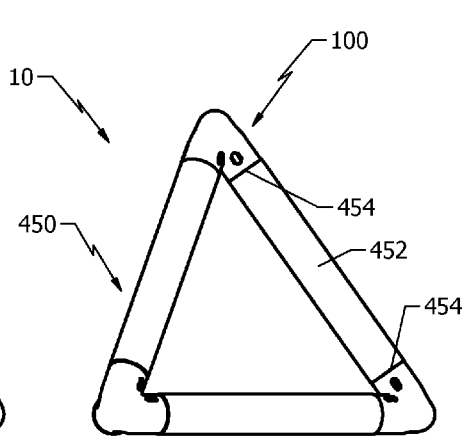
FIG. 2 is a second isometric view of the present invention.
Figure 3:
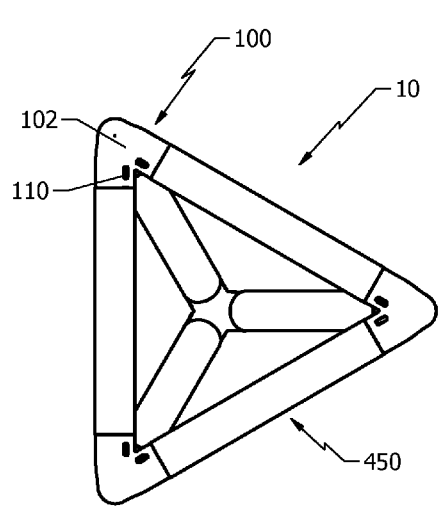
FIG. 3 is a third isometric view of the present invention.
Figure 4:
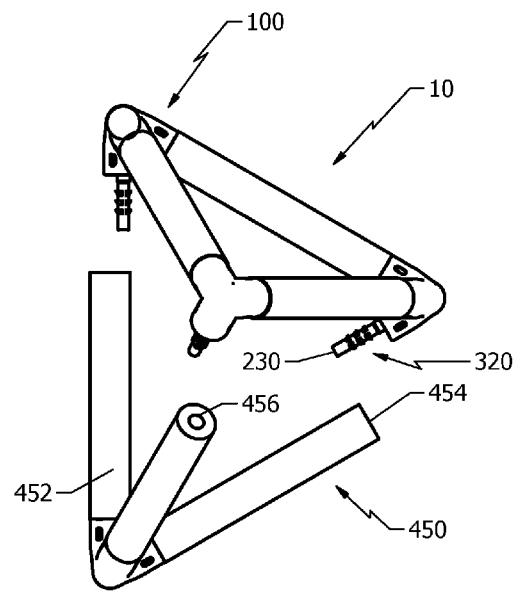
FIG. 4 is a partial exploded view of the present invention seen in the figures above.

Referring now to the drawings, the present invention is a cylindrical foam tube strengthening and interconnecting system and is generally referred to with numeral 10. It can be observed that it basically includes housings 20; 40; 60; 80; 100; 120; 140; 160; 180; and 200, connectors 220; 250; 280; 300; 320; 350; 370; 390; 420; and 440, and tube 240.

Figure 19:
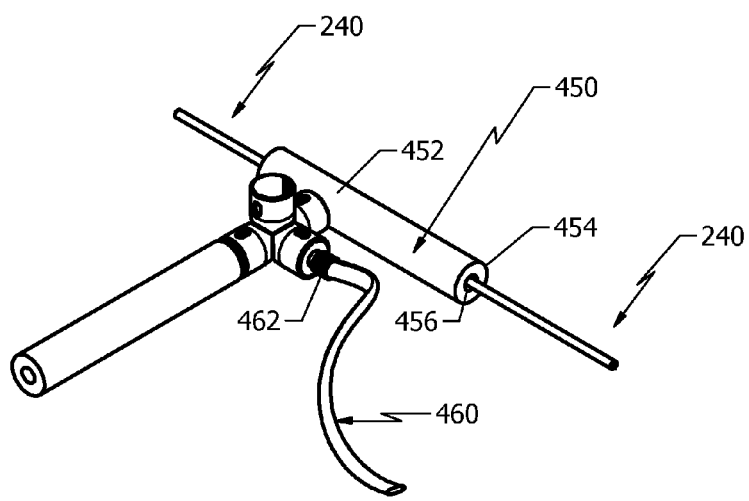
FIG. 19 is a first isometric view of a different configuration of the present invention.

As seen in FIGS. 1-4, instant invention 10 may result in a multitude of structures or configurations while using the above listed housings, connectors, and tube 240 seen in FIG. 19, if desired. The illustrated configurations comprise housings 100 and connectors 320, whereby ends 330 snugly fit within each hole 456 at a respective end 454 of noodle 450, thereby a cylindrical foam tube strengthening and interconnecting system. It is noted that any combination of housings 20; 40; 60; 80; 100; 120; 140; 160; 180; and 200, and connectors 220; 250; 280; 300; 320; 350; 370; 390; 420; and 440, and tube 240 can be utilized/assembled to be a cylindrical foam tube strengthening and interconnecting system.

Figure 5A:
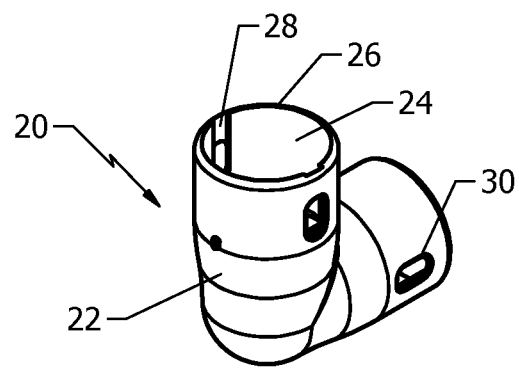
FIG. 5A is a first isometric view of a housing.
Figure 5B:
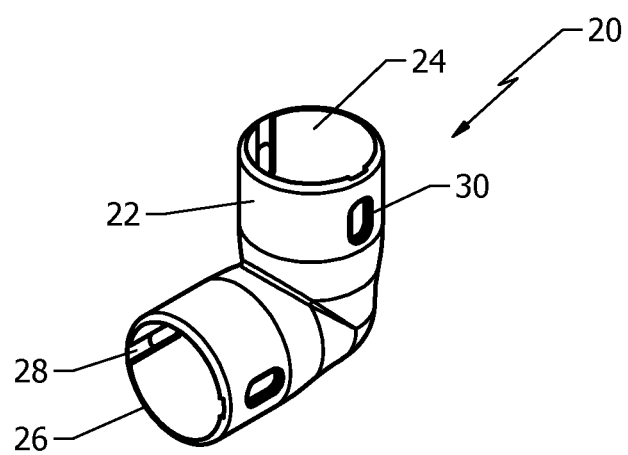
FIG. 5B is a second isometric view of the housing seen in FIG. 5A.

As seen in FIGS. 5A and 5B, housing 20 comprises exterior wall 22 and interior wall 24 having at least one edge 26. Extending a predetermined distance from edge 26, interior wall 24 has channel 28 that terminates at hole 30. In a preferred embodiment, housing 20 is made of a durable, weather resistant plastic material and/or composite comprising polyvinyl chloride, polyethylene, and/or polypropylene or materials having similar characteristics.

Figure 6A:
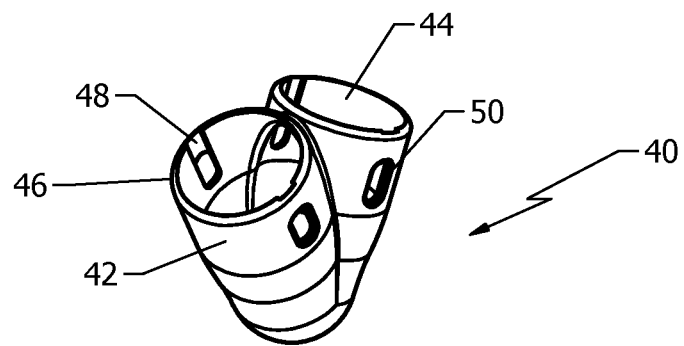
FIG. 6A is a first isometric view of a second embodiment housing.
Figure 6B:
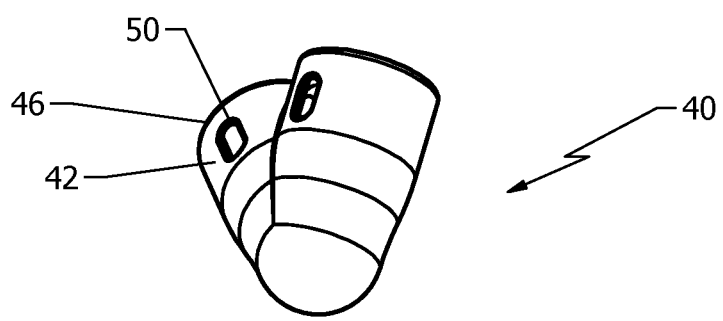
FIG. 6B is a second isometric view of the second embodiment housing seen in FIG. 6A.
Figure 6C:
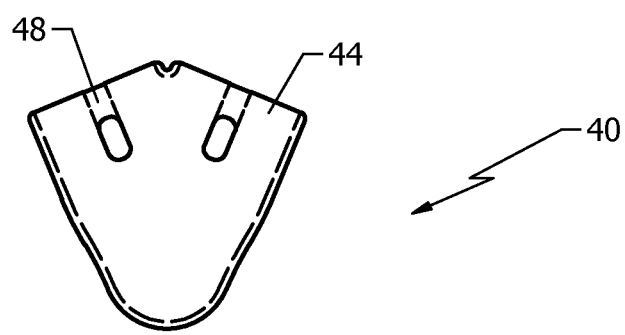
FIG. 6C is a front view of the second embodiment housing seen in FIG. 6A.

As seen in FIGS. 6A, 6B, and 6C, housing 40 comprises exterior wall 42 and interior wall 44 having at least one edge 46. Extending a predetermined distance from edge 46, interior wall 44 has channel 48 that terminates at hole 50. In a preferred embodiment, housing 40 is made of a durable, weather resistant plastic material and/or composite comprising polyvinyl chloride, polyethylene, and/or polypropylene or materials having similar characteristics.

Figure 7A:
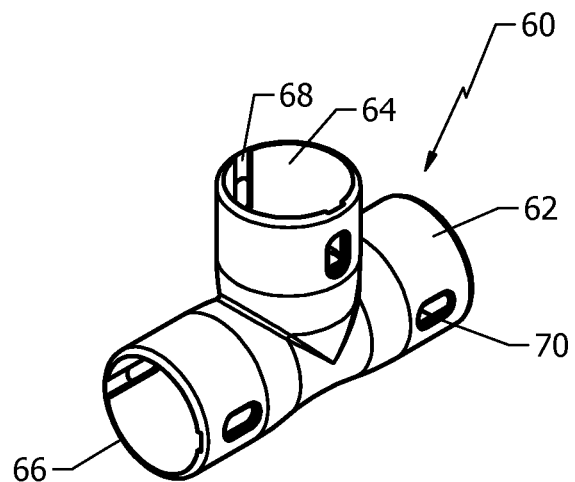
FIG. 7A is a first isometric view of a third embodiment housing.
Figure 7B:
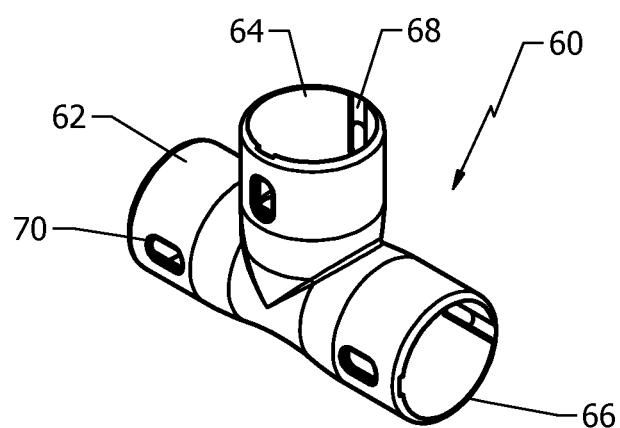
FIG. 7B is a second isometric view of the third embodiment housing seen in FIG. 7A.

As seen in FIGS. 7A and 7B, housing 60 comprises exterior wall 62 and interior wall 64 having at least one edge 66. Extending a predetermined distance from edge 66, interior wall 64 has channel 68 that terminates at hole 70. In a preferred embodiment, housing 60 is made of a durable, weather resistant plastic material and/or composite comprising polyvinyl chloride, polyethylene, and/or polypropylene or materials having similar characteristics.

Figure 8A:
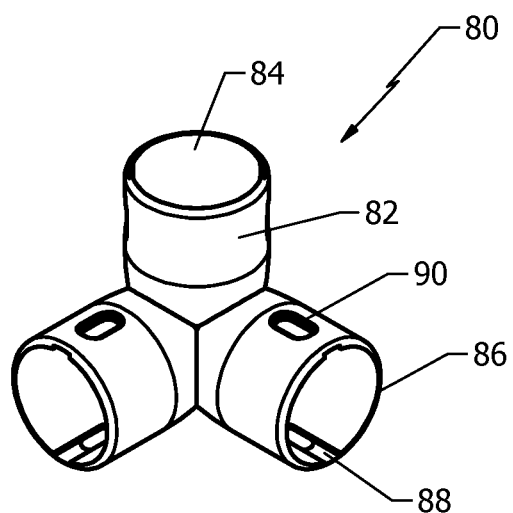
FIG. 8A is a first isometric view of a fourth embodiment housing.
Figure 8B:
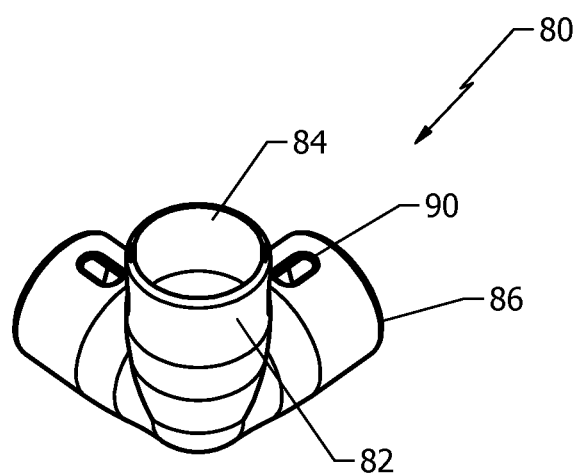
FIG. 8B is a second isometric view of the fourth embodiment housing seen in FIG. 8A.

As seen in FIGS. 8A and 8B, housing 80 comprises exterior wall 82 and interior wall 84 having at least one edge 86. Extending a predetermined distance from edge 86, interior wall 84 has channel 88 that terminates at hole 90. In a preferred embodiment, housing 80 is made of a durable, weather resistant plastic material and/or composite comprising polyvinyl chloride, polyethylene, and/or polypropylene or materials having similar characteristics.

Figure 9A:
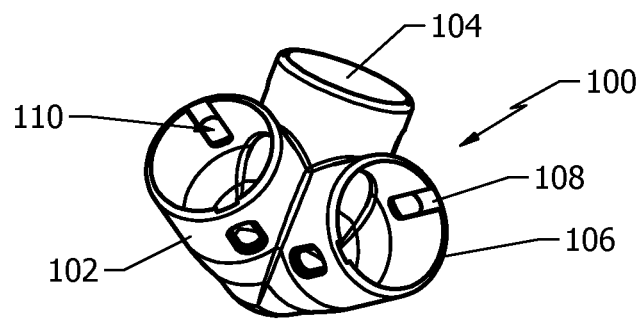
FIG. 9A is a first isometric view of a fifth embodiment housing.
Figure 9B:
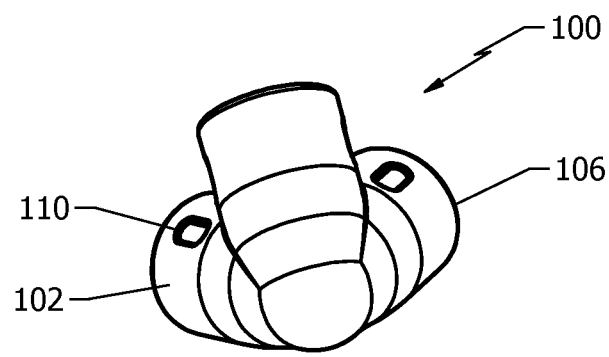
FIG. 9B is a second isometric view of the fifth embodiment housing seen in FIG. 9A.

As seen in FIGS. 9A and 9B, housing 100 comprises exterior wall 102 and interior wall 104 having at least one edge 106. Extending a predetermined distance from edge 106, interior wall 104 has channel 108 that terminates at hole 110. In a preferred embodiment, housing 100 is made of a durable, weather resistant plastic material and/or composite comprising polyvinyl chloride, polyethylene, and/or polypropylene or materials having similar characteristics.

As seen in FIGS. 10A, 10B, and 10C, housing 120 comprises exterior wall 122 and interior wall 124 having at least one edge 126. Extending a predetermined distance from edge 126, interior wall 124 has channel 128 that terminates at hole 130. In a preferred embodiment, housing 120 is made of a durable, weather resistant plastic material and/or composite comprising polyvinyl chloride, polyethylene, and/or polypropylene or materials having similar characteristics.

Figures 11A, 11B:
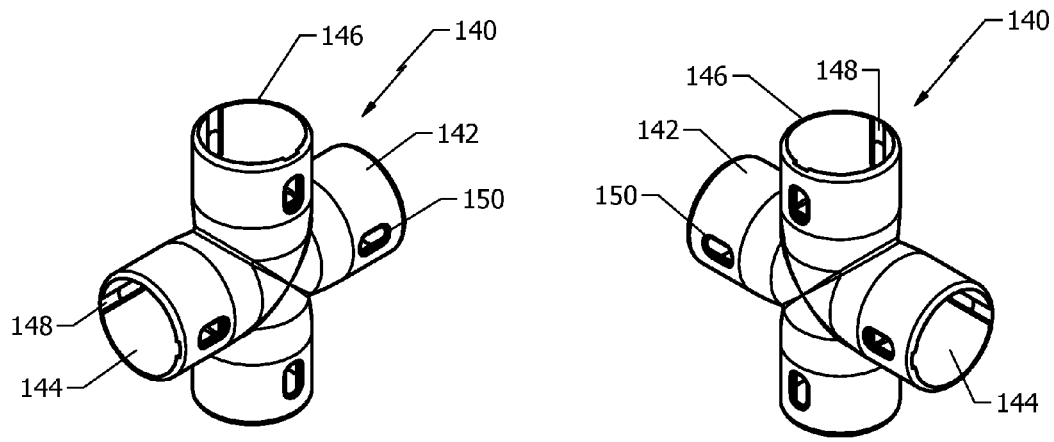
FIG. 11A is a first isometric view of a seventh embodiment housing.
FIG. 11B is a second isometric view of the seventh embodiment housing seen in FIG. 11A.
Figure 11C:
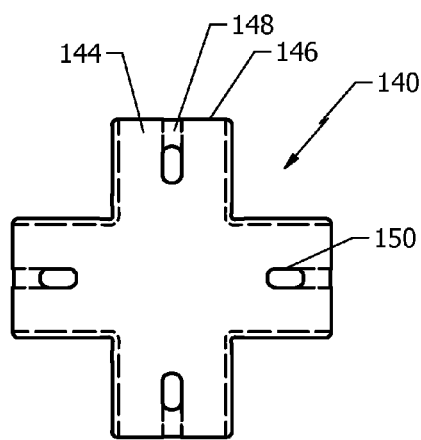
FIG. 11C is a front view of the seventh embodiment housing seen in FIG. 11A.

As seen in FIGS. 11A, 11B, and 11C, housing 140 comprises exterior wall 142 and interior wall 144 having at least one edge 146. Extending a predetermined distance from edge 146, interior wall 144 has channel 148 that terminates at hole 150. In a preferred embodiment, housing 140 is made of a durable, weather resistant plastic material and/or composite comprising polyvinyl chloride, polyethylene, and/or polypropylene or materials having similar characteristics.

Figure 12A:
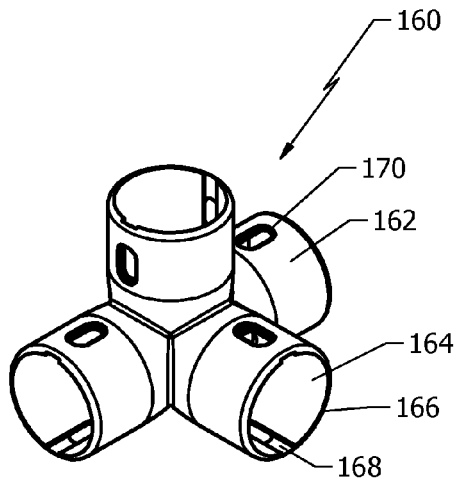
FIG. 12A is a first isometric view of an eighth embodiment housing.
Figure 12B:
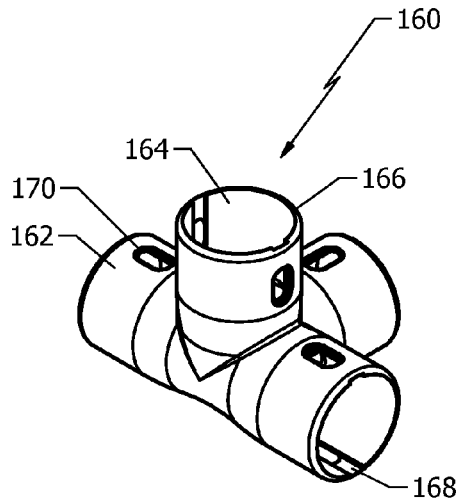
FIG. 12B is a second isometric view of the eighth embodiment housing seen in FIG. 12A.
Figure 12C:
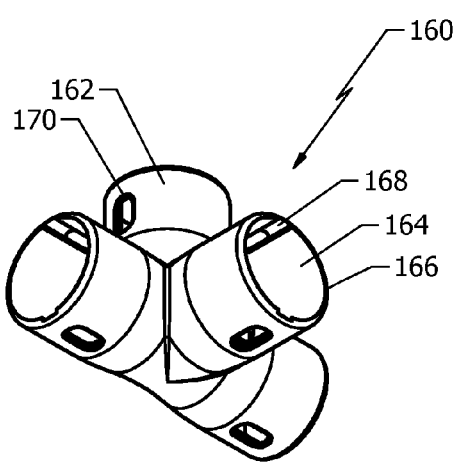
FIG. 12C is a third isometric view of the eighth embodiment housing seen in FIG. 12A.

As seen in FIGS. 12A, 12B, and 12C, housing 160 comprises exterior wall 162 and interior wall 164 having at least one edge 166. Extending a predetermined distance from edge 166, interior wall 164 has channel 168 that terminates at hole 170. In a preferred embodiment, housing 160 is made of a durable, weather resistant plastic material and/or composite comprising polyvinyl chloride, polyethylene, and/or polypropylene or materials having similar characteristics.

Figure 13A:
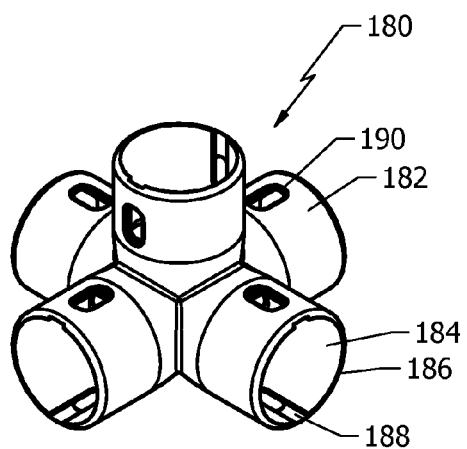
FIG. 13A is a first isometric view of a ninth embodiment housing.
Figure 13B:
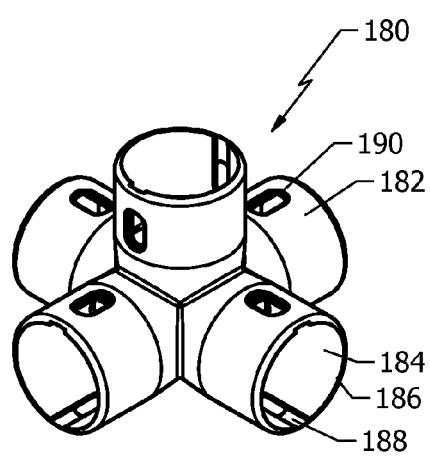
FIG. 13B is a second isometric view of the ninth embodiment housing seen in FIG. 13A.
Figure 13C:
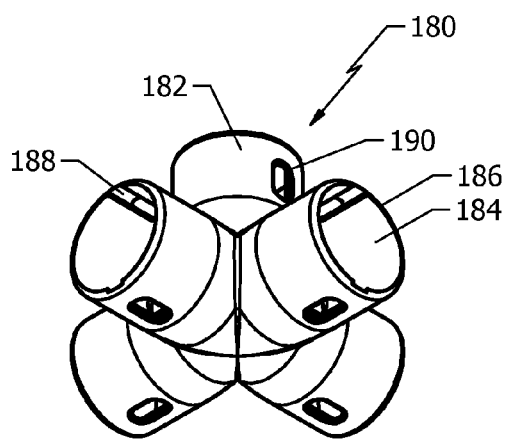
FIG. 13C is a third isometric view of the ninth embodiment housing seen in FIG. 13A.

As seen in FIGS. 13A, 13B, and 13C, housing 180 comprises exterior wall 182 and interior wall 184 having at least one edge 186. Extending a predetermined distance from edge 186, interior wall 184 has channel 188 that terminates at hole 190. In a preferred embodiment, housing 180 is made of a durable, weather resistant plastic material and/or composite comprising polyvinyl chloride, polyethylene, and/or polypropylene or materials having similar characteristics.

Figure 14A:
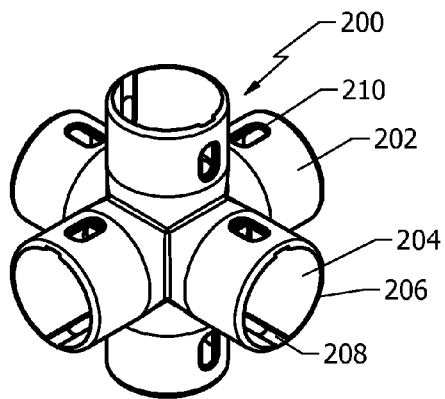
FIG. 14A is a first isometric view of a tenth embodiment housing.
Figure 14B:
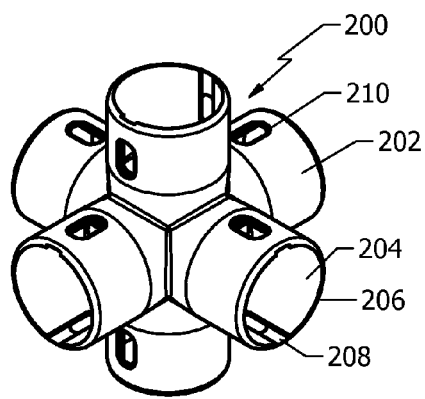
FIG. 14B is a second isometric view of the tenth embodiment housing seen in FIG. 14A.
Figure 14C:
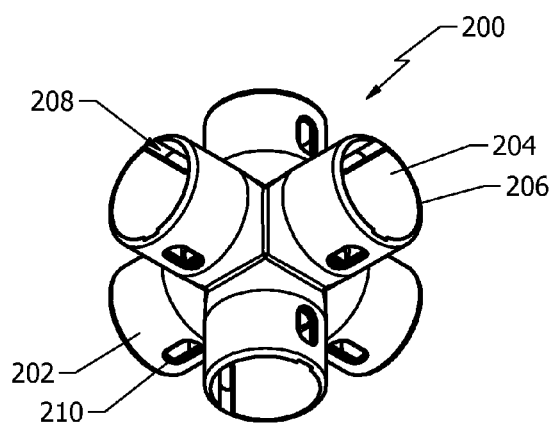
FIG. 14C is a third isometric view of the tenth embodiment housing seen in FIG. 14A.

As seen in FIGS. 14A, 14B, and 14C, housing 200 comprises exterior wall 202 and interior wall 204 having at least one edge 206. Extending a predetermined distance from edge 206, interior wall 204 has channel 208 that terminates at hole 210. In a preferred embodiment, housing 200 is made of a durable, weather resistant plastic material and/or composite comprising polyvinyl chloride, polyethylene, and/or polypropylene or materials having similar characteristics.

It is noted that housings 20; 40; 60; 80; 100; 120; 140; 160; 180; and 200 have at least one angle.

Figure 15A:
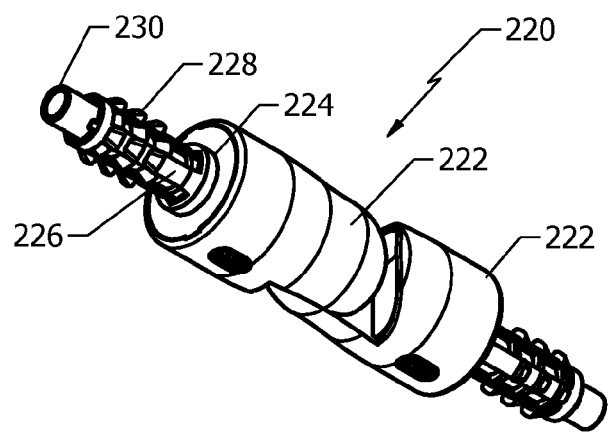
FIG. 15A is a first isometric view of a connector.
Figure 15B:
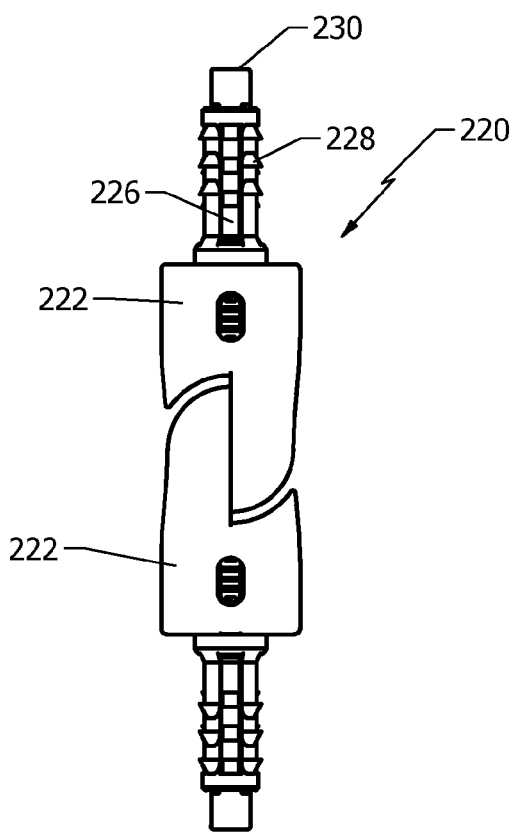
FIG. 15B is a side view of the connector seen in FIG. 15A.
Figure 15C:
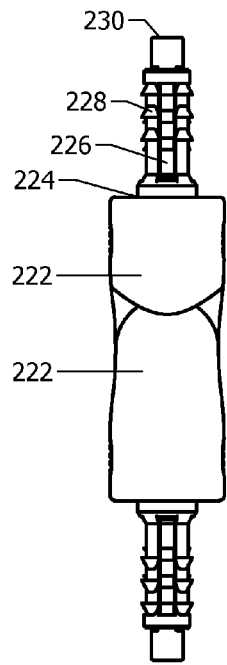
FIG. 15C is a first front view of the connector seen in FIG. 15A.

As seen in FIGS. 15A, 15B, and 15C connector 220 comprises base 222. Extending from base 222 is shaft 226 having ends 224 and 230. In a preferred embodiment, shaft 226 comprises protrusions 228 designed to snugly fit within each hole 456 at a respective end 454 of noodle 450, seen in FIG. 4, until end 454 abuts base 222.

Figure 15D:
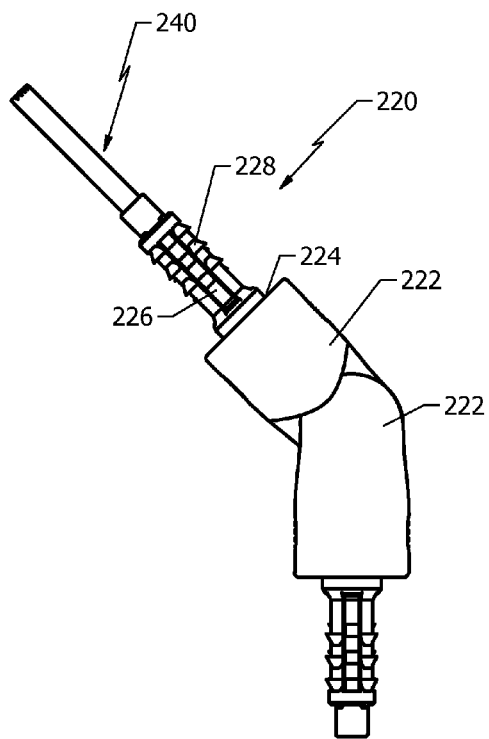
FIG. 15D is a second front view of the connector seen in FIG. 15A at a first angle.
Figure 15E:
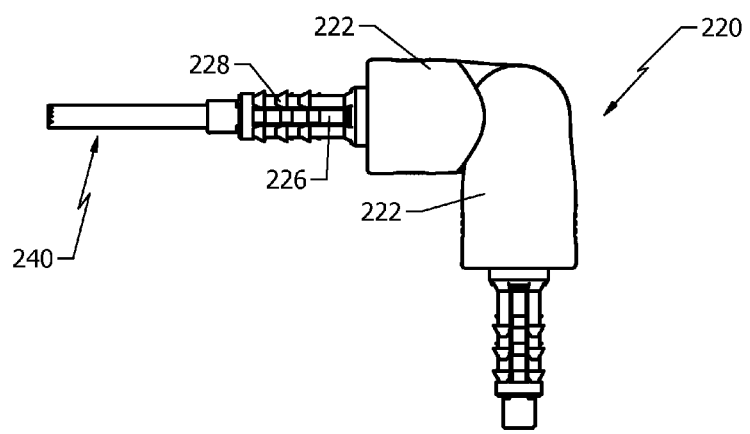
FIG. 15E is a third front view of the connector seen in FIG. 15A at a second angle.

As seen in FIGS. 15D and 15E, it is noted that each end 230 has a cooperative shape and dimension to snugly receive a distal end of tube 240. In addition, connector 220, having a hinge system, is able to adjust to various angles. In a preferred embodiment, connector 220 is made of a durable, weather resistant plastic material and/or composite comprising polyvinyl chloride, polyethylene, and/or polypropylene or materials having similar characteristics.

Figure 16A:
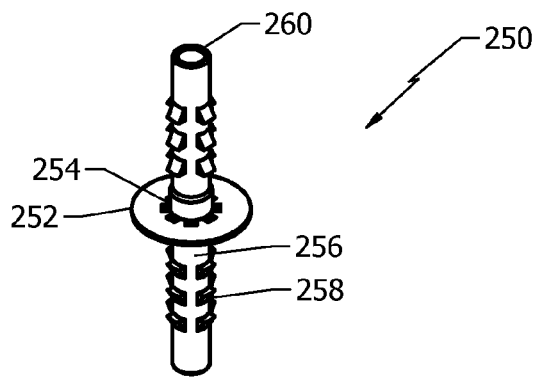
FIG. 16A is a first isometric view of a second embodiment connector.
Figure 16B:
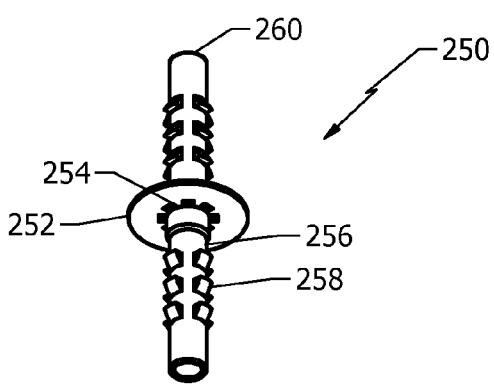
FIG. 16B is a second isometric view of the second embodiment connector seen in FIG. 16A.
Figure 16C:
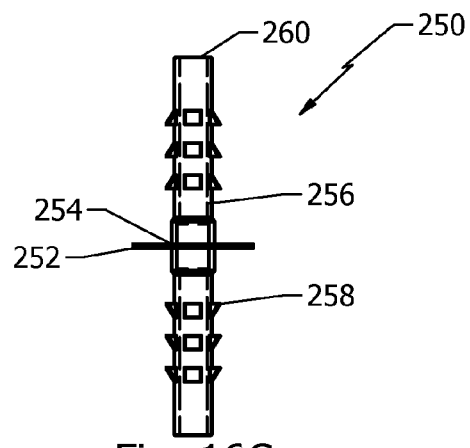
FIG. 16C is a front view of the second embodiment connector seen in FIG. 16A.

As seen in FIGS. 16A, 16B, and 16C connector 250 comprises base 252. Extending from base 252 is shaft 256 having ends 254 and 260. In a preferred embodiment, shaft 256 comprises protrusions 258 designed to snugly fit within each hole 456 at a respective end 454 of noodle 450, seen in FIG. 4, until end 454 abuts base 252. It is noted that each end 260 has a cooperative shape and dimension to snugly receive a distal end of tube 240, seen in FIG. 21E. In a preferred embodiment, connector 250 is made of a durable, weather resistant plastic material and/or composite comprising polyvinyl chloride, polyethylene, and/or polypropylene or materials having similar characteristics.

Figure 17A:
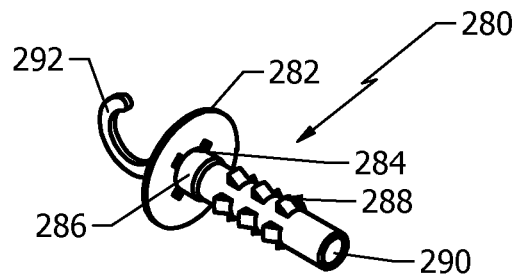
FIG. 17A is a first isometric view of a third embodiment connector.
Figure 17B:
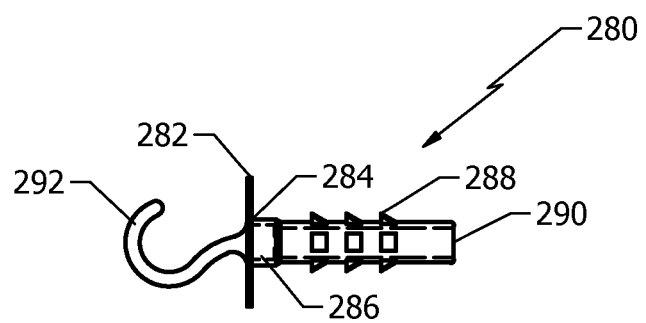
FIG. 17B is a side view of the third embodiment connector seen in FIG. 17A.
Figure 17C:
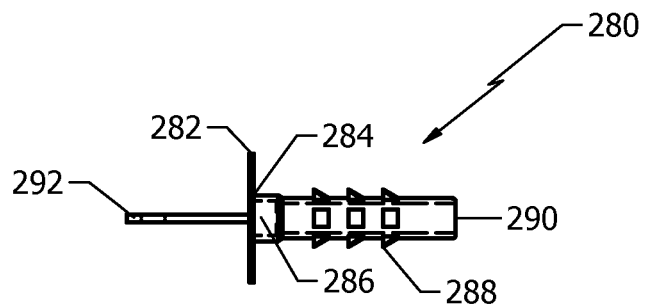
FIG. 17C is a front view of the third embodiment connector seen in FIG. 17A.

As seen in FIGS. 17A, 17B, and 17C connector 280 comprises base 282. Extending from base 282 is shaft 286 having ends 284 and 290. In a preferred embodiment, shaft 286 comprises protrusions 288 designed to snugly fit within each hole 456 at a respective end 454 of noodle 450, seen in FIG. 4, until end 454 abuts base 282. Also extending from base 282 is hook 292. In a preferred embodiment, connector 280 is made of a durable, weather resistant plastic material and/or composite comprising polyvinyl chloride, polyethylene, and/or polypropylene or materials having similar characteristics.

Figure 18A:
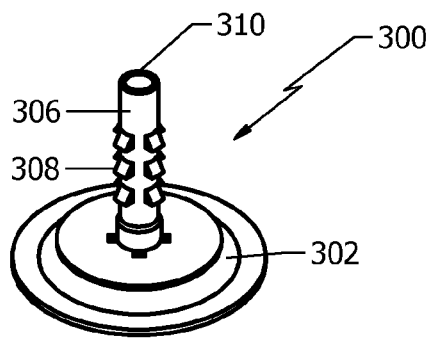
FIG. 18A is a first isometric view of a fourth embodiment connector.
Figure 18B:
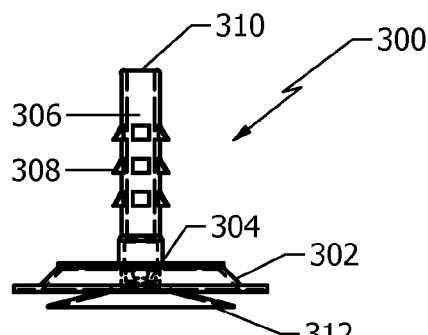
FIG. 18B is a side view of the fourth embodiment connector seen in FIG. 18A.
Figure 18C:
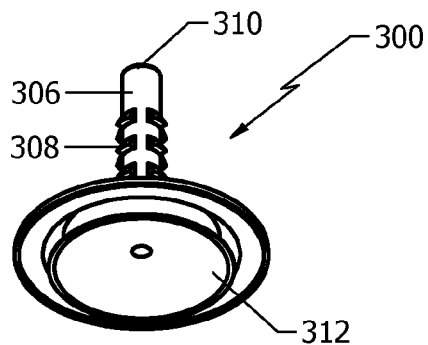
FIG. 18C is a second isometric view of the fourth embodiment connector seen in FIG. 18A.

As seen in FIGS. 18A, 18B, and 18C connector 300 comprises base 302. Extending from base 302 is shaft 306 having ends 304 and 310. In a preferred embodiment, shaft 306 comprises protrusions 308 designed to snugly fit within each hole 456 at a respective end 454 of noodle 450, seen in FIG. 4, until end 454 abuts base 302. Also mounted onto base 302 is suction cup 312. In a preferred embodiment, connector 300 is made of a durable, weather resistant plastic material and/or composite comprising polyvinyl chloride, polyethylene, and/or polypropylene or materials having similar characteristics.

Figure 20:
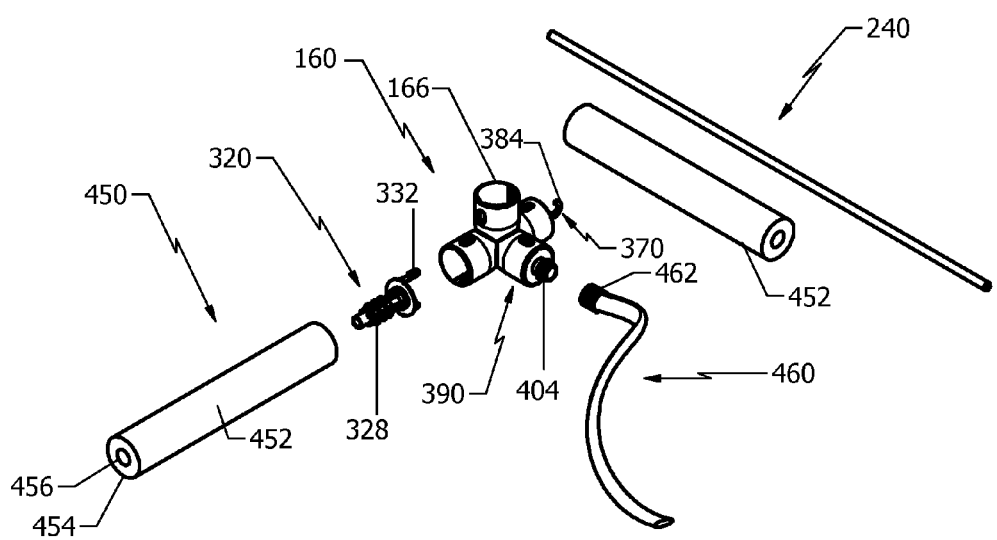
FIG. 20 is a partial exploded view of the different configuration of the present invention seen in FIG. 19.

As seen in FIGS. 19 and 20, instant invention 10 may again result in a multitude of structures or configurations while using the above listed housings, connectors, and tube 240 if desired. The illustrated configuration, being a section of any complete configuration, comprises housing 160 and connectors 320; 370; and 390, whereby protrusions 328 are designed to snugly fit within each hole 456 at a respective end 454 of noodle 450, thereby functioning as a cylindrical foam tube strengthening and interconnecting system. Fitting 404 may receive fitting 462 of hose 460. In addition, hook 384 may be forced into a section of sidewall 452 of noodle 450, whereby hook 384 would remain within an elongated cavity defined in noodle 450 that typically extends from one end of noodle 450 to its other end. Once hook 384 is within the elongated cavity defined in noodle 450, tube 240 may extend through one end of noodle 450 and through hook 384 to strengthen the built assembly being cylindrical foam tube strengthening and interconnecting system 10.

As seen in FIGS. 21A, 21B, 21C, and 21D connector 320 comprises base 322. Extending from base 322 is shaft 326 having ends 324 and 330. In a preferred embodiment, shaft 326 comprises protrusions 328 designed to snugly fit within each hole 456 at a respective end 454 of noodle 450, seen in FIG. 20, until end 454 abuts as close as possible to base 322.

Figure 21A:
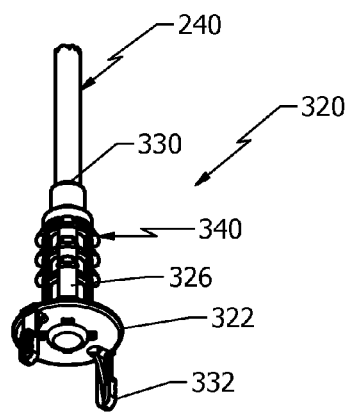
FIG. 21A is a first isometric view of a fifth embodiment connector.
Figure 21B:
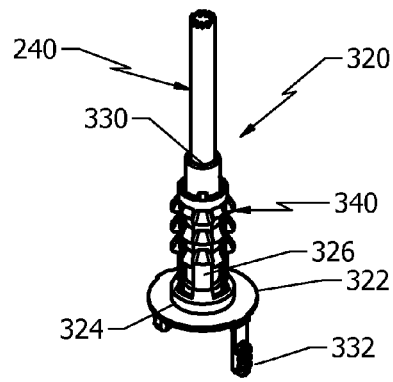
FIG. 21B is a second isometric view of the fifth embodiment connector seen in FIG. 21A.
Figure 21C:
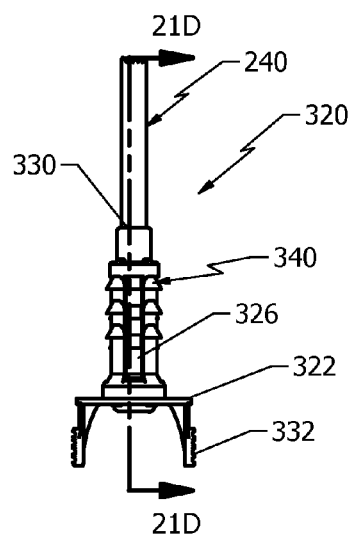
FIG. 21C is a front view of the fifth embodiment connector seen in FIG. 21A.
Figure 21D:
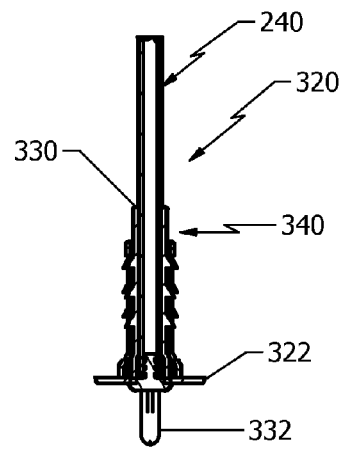
FIG. 21D is a cut view of the fifth embodiment connector taken along the lines 21 D-21 D as seen in FIG. 21C.
Figure 21E:
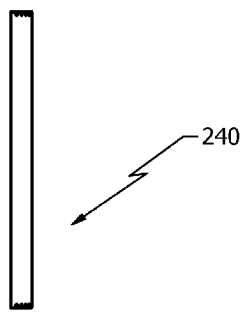
FIG. 21E is a first exploded view of the fifth embodiment connector seen in FIG. 21A.
Figure 21E:
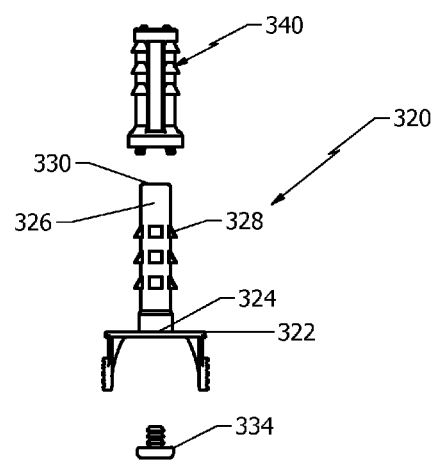
Figure 21F:
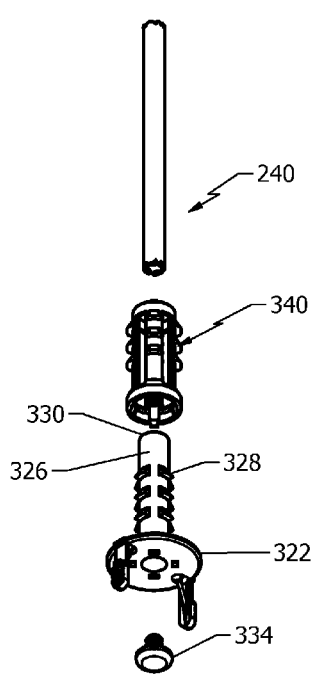
FIG. 21F is a first exploded perspective view of the fifth embodiment connector seen in FIG. 21A.
Figure 21G:
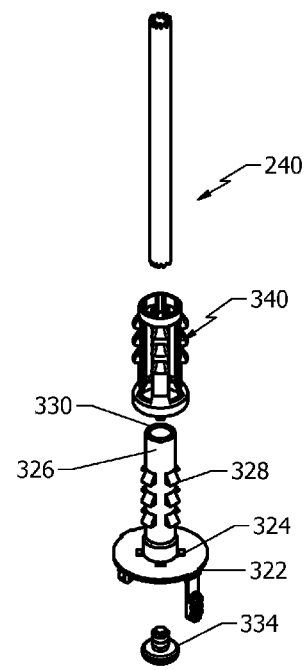
FIG. 21G is a second exploded perspective view of the fifth embodiment connector seen in FIG. 21A.

As seen in FIGS. 21E, 21F, and 21G it is noted that each end 330 has a cooperative shape and dimension to snugly receive a distal end of tube 240. In addition, connector 320, may comprise sleeve 340 that fits over shaft 326. Also extending from base 322 are tabs 332 designed to fill or fit within holes 30; 50; 70; 90; 110; 130; 150; 170; 190; and 210 of their respective housings. Connector 320 further comprises plug 334 that inserts into base 322. In a preferred embodiment, connector 320 is made of a durable, weather resistant plastic material and/or composite comprising polyvinyl chloride, polyethylene, and/or polypropylene or materials having similar characteristics.

Figure 22A:
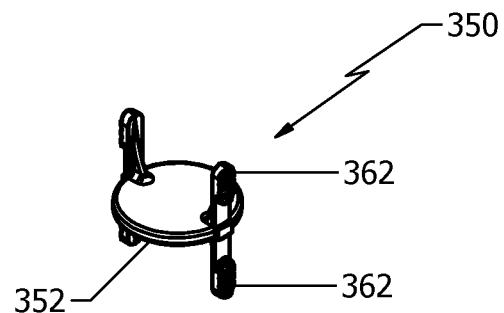
FIG. 22A is a first isometric view of a sixth embodiment connector.
Figure 22B:
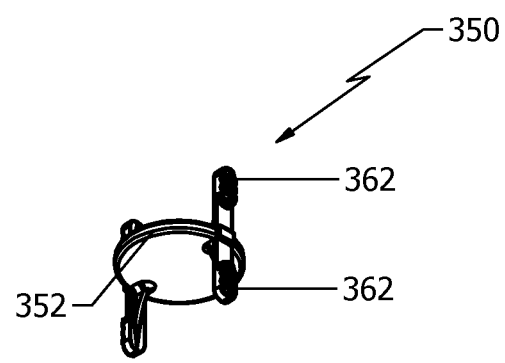
FIG. 22B is a second isometric view of the sixth embodiment connector seen in FIG. 22A.

As seen in FIGS. 22A and 22B connector 350 comprises base 352. Extending from base 352 are tabs 362 designed to fill or fit within holes 30; 50; 70; 90; 110; 130; 150; 170; 190; and 210 of their respective housings. In a preferred embodiment, connector 350 is made of a durable, weather resistant plastic material and/or composite comprising polyvinyl chloride, polyethylene, and/or polypropylene or materials having similar characteristics.

Figure 23A:
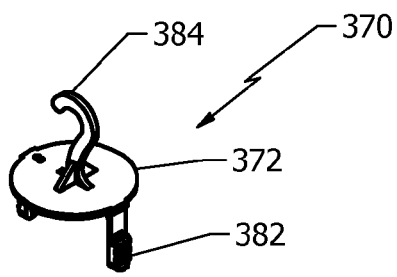
FIG. 23A is a first isometric view of a seventh embodiment connector.
Figure 23B:
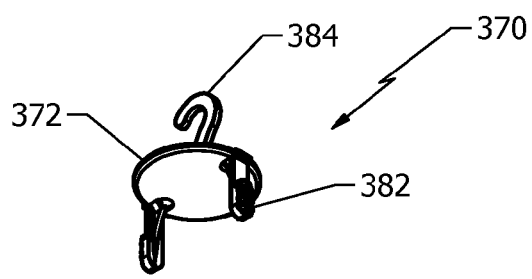
FIG. 23B is a second isometric view of the seventh embodiment connector seen in FIG. 23A.
Figure 23C:
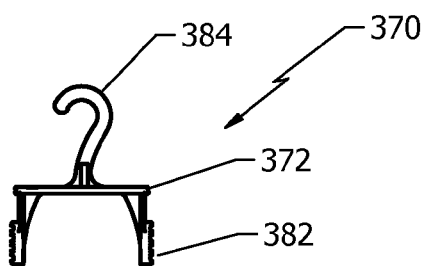
FIG. 23C is a side view of the seventh embodiment connector seen in FIG. 23A.

As seen in FIGS. 23A and 23B connector 370 comprises base 372. Extending from base 372 are tabs 382 designed to fill or fit within holes 30; 50; 70; 90; 110; 130; 150; 170; 190; and 210 of their respective housings. Also extending from base 372 is hook 384. In a preferred embodiment, connector 370 is made of a durable, weather resistant plastic material and/or composite comprising polyvinyl chloride, polyethylene, and/or polypropylene or materials having similar characteristics.

Figure 24A:
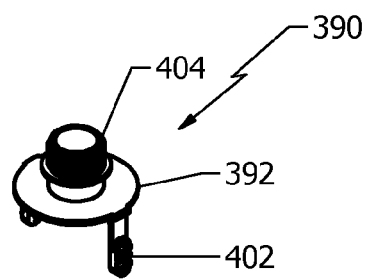
FIG. 24A is a first isometric view of an eighth embodiment connector.
Figure 24B:
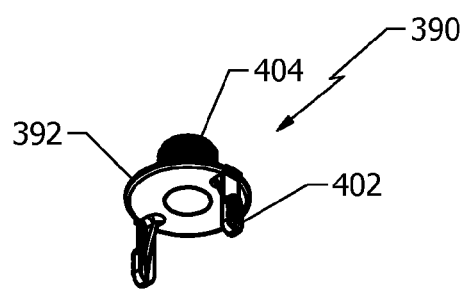
FIG. 24B is a second isometric view of the eighth embodiment connector seen in FIG. 24A.
Figure 24C:
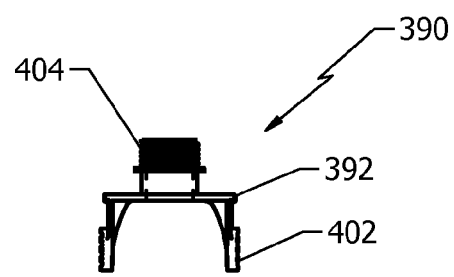
FIG. 24C is a side view of the eighth embodiment connector seen in FIG. 24A.

As seen in FIGS. 24A and 24B connector 390 comprises base 392. Extending from base 392 are tabs 402 designed to fill or fit within holes 30; 50; 70; 90; 110; 130; 150; 170; 190; and 210 of their respective housings. Also extending from base 392 is fitting 404. In a preferred embodiment, connector 390 is made of a durable, weather resistant plastic material and/or composite comprising polyvinyl chloride, polyethylene, and/or polypropylene or materials having similar characteristics.

Figure 25A:
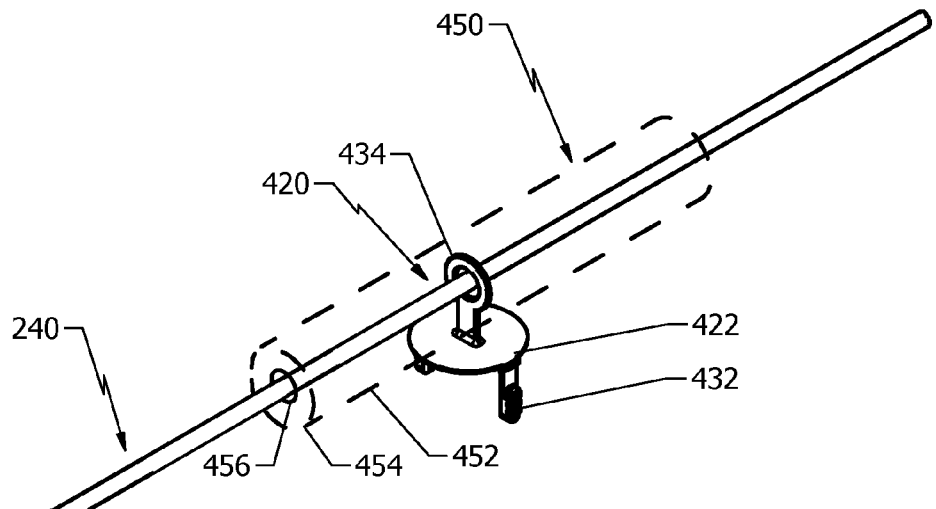
FIG. 25A is a first isometric view of a ninth embodiment connector.
Figure 25B:
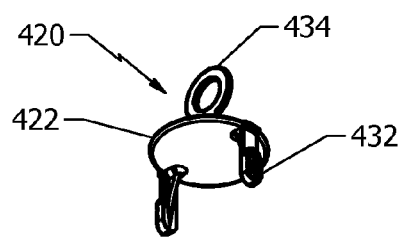
FIG. 25B is a second isometric view of the ninth embodiment connector seen in FIG. 25A.
Figure 25C:
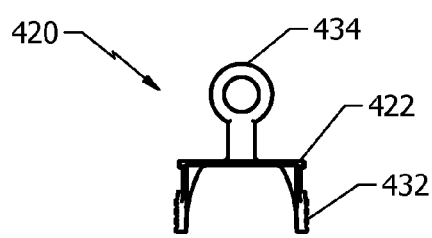
FIG. 25C is a front view of the ninth embodiment connector seen in FIG. 25A.

As seen in FIGS. 25A, 25B, and 25C connector 420 comprises base 422. Extending from base 422 are tabs 432 designed to fill or fit within holes 30; 50; 70; 90; 110; 130; 150; 170; 190; and 210 of their respective housings. Also extending from base 422 is ring 434. Ring 434 may be forced into a section of sidewall 452 of noodle 450, whereby ring 434 would remain within an elongated cavity defined in noodle 450 that typically extends from one end of noodle 450 to its other end. Once ring 434 is within the elongated cavity defined in noodle 450, tube 240 may extend through one end of noodle 450 and through ring 434 to strengthen the built assembly being cylindrical foam tube strengthening and interconnecting system 10. In a preferred embodiment, connector 420 is made of a durable, weather resistant plastic material and/or composite comprising polyvinyl chloride, polyethylene, and/or polypropylene or materials having similar characteristics.

Figure 26A:
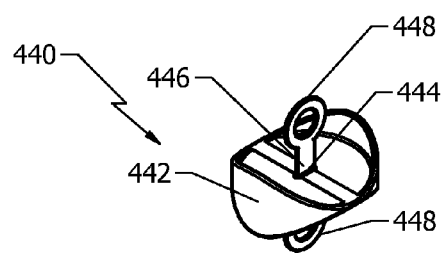
FIG. 26A is a first isometric view of a tenth embodiment connector.
Figure 26B:
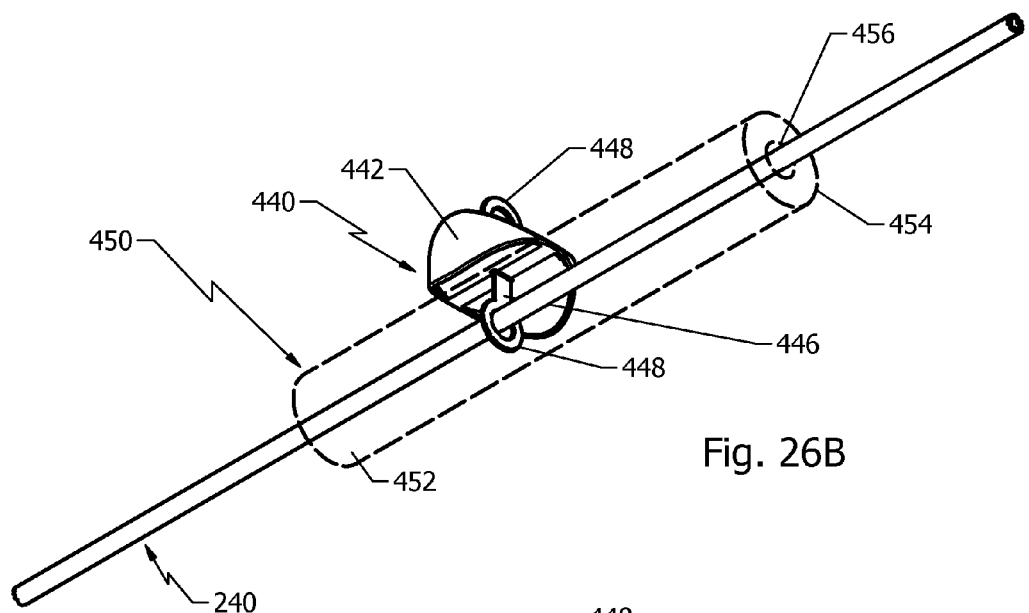
FIG. 26B is a second isometric view of the tenth embodiment connector seen in FIG. 26A.
Figure 26C:
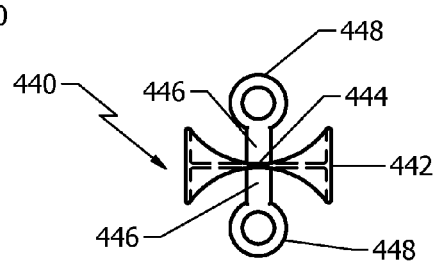
FIG. 26C is a front view of the tenth embodiment connector seen in FIG. 26A.

As seen in FIGS. 26A, 26B, and 26C connector 440 comprises base 442. Extending from base 442 are rings 448, each having end 444 and shaft 446. Each ring 448 may be forced into a section of sidewall 452 of a respective noodle 450, whereby ring 448 would remain within an elongated cavity defined in the respective noodle 450 that typically extends from one end of noodle 450 to its other end. Once ring 448 is within the elongated cavity defined in the respective noodle 450, tubes 240 may extend through ends of each noodle 450 and through rings 448 to strengthen the built assembly being cylindrical foam tube strengthening and interconnecting system 10. A combination of housings 20; 40; 60; 80; 100; 120; 140; 160; 180; and 200, and connectors 220; 250; 280; 300; 320; 350; 370; 390; 420; and 440, and tube 240 can be utilized/assembled to be a cylindrical foam tube strengthening and interconnecting system 10 in a raft configuration as an example. In a preferred embodiment, connector 440 is made of a durable, weather resistant plastic material and/or composite comprising polyvinyl chloride, polyethylene, and/or polypropylene or materials having similar characteristics.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cylindrical foam tube strengthening and interconnecting system, comprising:
   A) at least one housing comprising an exterior wall and an interior wall having at least one edge, extending a predetermined distance from said at least one edge, said interior wall has at least one channel that terminates at a hole, said hole extends from said interior wall to said exterior wall; and
   B) at least one connector fixed to said at least one housing and to a cylindrical foam tube to build a structure, said at least one connector has a hinge system to allow said connector to adjust to various angles, said at least one connector comprises a base, extending from said base is at least one ring positioned within an elongated cavity defined in said cylindrical foam tube, said at least one ring receives a distal end of a tube therethrough.

2. The cylindrical foam tube strengthening and interconnecting system set forth in claim 1, further characterized in that said at least one housing comprises at least one angle.

3. The cylindrical foam tube strengthening and interconnecting system set forth in claim 1, further characterized in that said at least one housing is made of a plastic material or composite comprising polyvinyl chloride, polyethylene, or polypropylene.

4. The cylindrical foam tube strengthening and interconnecting system set forth in claim 1, further characterized in that said at least one housing is buoyant.

5. A cylindrical foam tube strengthening and interconnecting system, comprising:
   A) at least one housing comprising an exterior wall and an interior wall having at least one edge, extending a predetermined distance from said at least one edge, said interior wall has at least one channel that terminates at a hole, said hole extends from said interior wall to said exterior wall; and
   B) at least one connector fixed to said at least one housing and to a cylindrical foam tube to build a structure, said at least one connector has a base, extending from said base is at least one hook positioned within an elongated cavity defined in said cylindrical foam tube, said cylindrical foam tube comprises a sidewall, said at least one hook receives a distal end of a tube therethrough when said at least one hook is forced into a section of said sidewall, whereby said at least one hook remains within said elongated cavity when said distal end of said tube passes through said elongated cavity and said at least one hook.

6. The cylindrical foam tube strengthening and interconnecting system set forth in claim 5, further characterized in that said at least one housing comprises at least one angle.

7. The cylindrical foam tube strengthening and interconnecting system set forth in claim 5, further characterized in that said at least one housing is made of a plastic material or composite comprising polyvinyl chloride, polyethylene, or polypropylene.

8. The cylindrical foam tube strengthening and interconnecting system set forth in claim 5, further characterized in that said at least one housing is buoyant.

9. A cylindrical foam tube strengthening and interconnecting system, comprising:
   A) at least one housing comprising an exterior wall and an interior wall having at least one edge, extending a predetermined distance from said at least one edge, said interior wall has at least one channel that terminates at a hole, said hole extends from said interior wall to said exterior wall; and
   B) at least one connector fixed to said at least one housing and to a cylindrical foam tube to build a structure, said at least one connector has a base, extending from said base is at least one suction cup.

10. The cylindrical foam tube strengthening and interconnecting system set forth in claim 9, further characterized in that said at least one housing comprises at least one angle.

11. The cylindrical foam tube strengthening and interconnecting system set forth in claim 9, further characterized in that said at least one housing is made of a plastic material or composite comprising polyvinyl chloride, polyethylene, or polypropylene.

12. The cylindrical foam tube strengthening and interconnecting system set forth in claim 9, further characterized in that said at least one housing is buoyant.

13. The cylindrical foam tube strengthening and interconnecting system set forth in claim 9, further characterized in that extending from said base is at least one shaft, each said at least one shaft having first and second ends.

14. The cylindrical foam tube strengthening and interconnecting system set forth in claim 12, further characterized in that said at least one shaft comprises protrusions.

15. The cylindrical foam tube strengthening and interconnecting system set forth in claim 13, further characterized in that said first end fits within a hole of said noodle.

16. The cylindrical foam tube strengthening and interconnecting system set forth in claim 13, further characterized in that said first end receives a distal end of a tube.

17. The cylindrical foam tube strengthening and interconnecting system set forth in claim 9, further characterized in that extending from said base is at least one fitting.

18. The cylindrical foam tube strengthening and interconnecting system set forth in claim 9, further characterized in that extending from said base is at least one ring.

19. The cylindrical foam tube strengthening and interconnecting system set forth in claim 18, further characterized in that said at least one ring is positioned within an elongated cavity defined in said cylindrical foam tube.

20. The cylindrical foam tube strengthening and interconnecting system set forth in claim 18, further characterized in that said at least one ring receives a distal end of a tube therethrough.

21. The cylindrical foam tube strengthening and interconnecting system set forth in claim 9, further characterized in that said at least one connector is made of a durable, weather resistant plastic material or composite comprising polyvinyl chloride, polyethylene, or polypropylene.

22. A cylindrical foam tube strengthening and interconnecting system, comprising:
   A) at least one housing comprising an exterior wall and an interior wall having at least one edge, extending a predetermined distance from said at least one edge, said interior wall has at least one channel that terminates at a hole, said hole extends from said interior wall to said exterior wall; and
   B) at least one connector fixed to said at least one housing and to a cylindrical foam tube to build a structure, said at least one connector has a base, extending from said base is at least one hook, further characterized in that also extending from said base is at least one ring positioned within an elongated cavity defined in said cylindrical foam tube, said at least one ring receives a distal end of a tube therethrough.

23. The cylindrical foam tube strengthening and interconnecting system set forth in claim 22, further characterized in that said at least one connector is made of a durable, weather resistant plastic material or composite comprising polyvinyl chloride, polyethylene, or polypropylene.

24. A cylindrical foam tube strengthening and interconnecting system, comprising:
   A) at least one housing comprising an exterior wall and an interior wall having at least one edge, extending a predetermined distance from said at least one edge, said interior wall has at least one channel that terminates at a hole, said hole extends from said interior wall to said exterior wall; and
   B) at least one connector fixed to said at least one housing and to a cylindrical foam tube to build a structure, said at least one connector has a base, extending from said base are at least two tabs, further characterized in that extending from said base is at least one ring positioned within an elongated cavity defined in said cylindrical foam tube, said at least one ring receives a distal end of a tube therethrough.

25. The cylindrical foam tube strengthening and interconnecting system set forth in claim 24, further characterized in that said at least one housing comprises at least one angle.

26. The cylindrical foam tube strengthening and interconnecting system set forth in claim 24, further characterized in that said at least one housing is made of a plastic material or composite comprising polyvinyl chloride, polyethylene, or polypropylene.

27. The cylindrical foam tube strengthening and interconnecting system set forth in claim 24, further characterized in that said at least one housing is buoyant.

28. The cylindrical foam tube strengthening and interconnecting system set forth in claim 24, further characterized in that said at least one connector is made of a durable, weather resistant plastic material or composite comprising polyvinyl chloride, polyethylene, or polypropylene.

29. A cylindrical foam tube strengthening and interconnecting system, comprising:
   A) at least one housing comprising an exterior wall and an interior wall having at least one edge, extending a predetermined distance from said at least one edge, said interior wall has at least one channel that terminates at a hole, said hole extends from said interior wall to said exterior wall; and
   B) at least one connector fixed to said at least one housing and to a cylindrical foam tube to build a structure, whereby said at least one connector comprises a base, extending from said base are at least two tabs, each of said at least two tabs fill a respective said hole of said at least one channel, and also extending from said base is a shaft comprising an end and a plurality of protrusions, said end fits within a hole of said cylindrical foam tube.

30. The cylindrical foam tube strengthening and interconnecting system set forth in claim 29, further characterized in that said at least one housing comprises at least one angle.

31. The cylindrical foam tube strengthening and interconnecting system set forth in claim 29, further characterized in that said at least one housing is made of a plastic material or composite comprising polyvinyl chloride, polyethylene, or polypropylene.

32. The cylindrical foam tube strengthening and interconnecting system set forth in claim 29, further characterized in that said at least one housing is buoyant.

* * * * *